United States Patent
Si et al.

(10) Patent No.: US 10,687,360 B2
(45) Date of Patent: Jun. 16, 2020

(54) METHOD AND DEVICE FOR TRANSMITTING UPLINK CONTROL INFORMATION

(71) Applicant: China Academy of Telecommunications Technology, Beijing (CN)

(72) Inventors: Qianqian Si, Beijing (CN); Xuejuan Gao, Beijing (CN); Xueming Pan, Beijing (CN); Jiaqing Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/075,143

(22) PCT Filed: Jan. 18, 2017

(86) PCT No.: PCT/CN2017/071505
§ 371 (c)(1),
(2) Date: Aug. 3, 2018

(87) PCT Pub. No.: WO2017/133452
PCT Pub. Date: Aug. 10, 2017

(65) Prior Publication Data
US 2018/0376504 A1    Dec. 27, 2018

(30) Foreign Application Priority Data

Feb. 3, 2016    (CN) .......................... 2016 1 0078084

(51) Int. Cl.
*H04W 74/08*    (2009.01)
*H04W 76/28*    (2018.01)
(Continued)

(52) U.S. Cl.
CPC .......... *H04W 74/0808* (2013.01); *H04L 1/16* (2013.01); *H04L 1/1854* (2013.01);
(Continued)

(58) Field of Classification Search
CPC ......... H04W 74/0808; H04W 72/0446; H04W 72/0413; H04W 76/28; H04W 24/02;
(Continued)

(56) References Cited

U.S. PATENT DOCUMENTS

| 2013/0077541 A1* | 3/2013 | Lin | ........................ H04L 1/1861 |
| | | | 370/277 |
| 2013/0223318 A1* | 8/2013 | Liu | ......................... H04W 4/06 |
| | | | 370/312 |

(Continued)

FOREIGN PATENT DOCUMENTS

| CN | 102158326 A | 8/2011 |
| CN | 102255708 A | 11/2011 |

(Continued)

OTHER PUBLICATIONS

3GPP TS 36.213 V11.8.0, 3rd Generation Partnership Protect; Technical Specification Group Radio Access Network; Evolved Universal Terrestrial Radio Access (E-UTRA); Physical layer procedures (Release 11), Sep. 2014, 182 pages.

(Continued)

*Primary Examiner* — Hoang-Chuong Q Vu
(74) *Attorney, Agent, or Firm* — Kilpatrick Townsend & Stockton, LLP

(57) ABSTRACT

A method and device for transmitting uplink control information is described. The method includes according to the size and position of a feedback window, determining uplink control information; according to a transmission moment of the uplink control information, performing listen-before-talk detection to determine an actual uplink transmission
(Continued)

moment; and transmitting the determined uplink control information at an actual uplink transmission moment. In the embodiments of the present disclosure, under the situation where no channel is occupied at a set uplink control information transmission moment, one or more times of listen-before-talk detection are continued, and the determined uplink control information is transmitted on an actual uplink transmission moment, thereby avoiding the situation that uplink control information may not be correctly transmitted in time due to not occupying a channel, and further improving the system performance.

20 Claims, 7 Drawing Sheets

(51) Int. Cl.
    *H04W 72/04*     (2009.01)
    *H04L 1/16*     (2006.01)
    *H04L 1/18*     (2006.01)
    *H04L 5/00*     (2006.01)

(52) U.S. Cl.
    CPC ....... *H04L 5/0055* (2013.01); *H04W 72/0413* (2013.01); *H04W 72/0446* (2013.01); *H04W 76/28* (2018.02); *H04L 5/001* (2013.01)

(58) Field of Classification Search
    CPC ....... H04L 5/0055; H04L 1/1854; H04L 1/16; H04L 5/001; H04L 1/1671
    See application file for complete search history.

(56) References Cited

U.S. PATENT DOCUMENTS

| | | | |
|---|---|---|---|
| 2014/0029490 A1* | 1/2014 | Kim | H04L 5/1469 370/280 |
| 2014/0071932 A1* | 3/2014 | Fu | H04L 1/1854 370/329 |
| 2015/0098397 A1 | 4/2015 | Damnjanovic et al. | |
| 2016/0135214 A1* | 5/2016 | Chendamarai Kannan | H04L 5/14 370/280 |
| 2016/0345326 A1* | 11/2016 | Yerramalli | H04W 72/0453 |
| 2017/0054531 A1* | 2/2017 | Chae | H04L 1/1861 |
| 2017/0164345 A1 | 6/2017 | Goto et al. | |
| 2018/0013522 A1* | 1/2018 | Liu | H04L 5/0055 |

FOREIGN PATENT DOCUMENTS

| | | |
|---|---|---|
| CN | 102651678 A | 8/2012 |
| CN | 104540230 A | 4/2015 |
| CN | 104753649 A | 7/2015 |
| CN | 105101446 A | 11/2015 |
| WO | 2016/002855 A1 | 1/2016 |

OTHER PUBLICATIONS

Ericsson: "On UCI Design for LAA", 3GPP Draft; R1-151134, 3rd Generation Partnership Project (3GPP), Mobile Competence Centre ; 650, Route Des Lucioles ; F-06921 Sophia-Antipolis Cedex; France, vol. RAN WG1 , No. Paris, France; Mar. 24, 2015-Mar. 26, 2015 Mar. 18, 2015 (Mar. 18, 2015) , XP050951459, Retrieved from the Internet: URL:http://www.3gpp.org/ftp/tsg_ran/WG1_RL1/TSGR1_AH/LTE_LAA_1503/Docs/, [retrieved on Mar. 18, 2015].

\* cited by examiner

METHOD AND DEVICE FOR TRANSMITTING UPLINK CONTROL INFORMATION

This application is a US National Stage of International Application No. PCT/CN2017/071505, filed on Jan. 18, 2017, designating the United States and claiming the benefit of Chinese Patent Application No. 201610078084.X, filed with the Chinese Patent Office on Feb. 3, 2016, and entitled "A method and device for transmitting uplink control information". The entire content of each of the disclosures above is incorporated herein by reference.

FIELD

The present disclosure relates to the field of wireless communications, and particularly to a method and device for transmitting uplink control information.

BACKGROUND

In order to enable a Long Term Evolution (LTE) system to deploy transmission over an unlicensed spectrum, a Licensed Assisted Access (LAA) has been defined so far, that is, a terminal to access an unlicensed carrier shall firstly access a licensed primary carrier, where the unlicensed carrier can only operate as a secondary carrier.

Unlicensed spectrums have not been planned for any particular application system, but may be shared by various wireless communication systems, e.g., Bluetooth, WiFi, etc., where the various systems access shared unlicensed spectrum resources by preempting the resources. In order to guarantee transmission performance of an LTE terminal, and to make better use of an unlicensed band, the Listen Before Talk (LBT) mechanism shall be applied before data is transmitted in the unlicensed band. In an LBT process, the terminal performs Clear Channel Assessment (CCA) before it transmits data over a channel, to determine whether there is any other signal over the channel through energy detection so as to determine whether the channel is occupied or not, and only if the channel is idle, the terminal transmits data.

Since there are abundant unlicensed spectrum resources, the terminal may receive data concurrently over a large number of unlicensed carriers, and if an uplink control channel can only be transmitted over the licensed primary carrier, then there is a considerable overhead of uplink control channels over the licensed carrier, so an uplink control channel shall be transmitted over an unlicensed carrier. However, the resources over the unlicensed carriers are shared by the various systems, and the terminal shall firstly apply the LBT mechanism before it transmits data in the uplink, so the terminal may be unable to access a channel at certain time; and if the terminal fails to preempt a channel when it needs to transmit an uplink control channel, then uplink control information cannot be transmitted correctly in a timely manner.

At present, if an LBT check made over a corresponding unlicensed carrier to make Acknowledgement (ACK)/Negative Acknowledgment (NACK) feedback fails, then no feedback information can be transmitted.

SUMMARY

The disclosure provides a method and device for transmitting uplink control information so as to address the existing problem that if an LBT check made over a corresponding unlicensed carrier to make Acknowledgement (ACK)/Negative Acknowledgment (NACK) feedback fails, then no feedback information can be transmitted.

An embodiment of the disclosure provides a method for transmitting uplink control information. The method includes: determining, by a terminal, uplink control information according to a size of a feedback window and according to a position of the feedback window, where the feedback window is a set of at least one downlink sub-frame for which feedback is to be made in a same uplink sub-frame; performing, by the terminal, LBT detection according to transmission time of the uplink control information, and determining an actual uplink transmission time; and transmitting, by the terminal, the determined uplink control information at the actual uplink transmission time.

In an embodiment, the terminal determines the size of the feedback window in one or a combination of following ways: the terminal determines the size of the feedback window according to a notification of a network-side device; and the terminal determines the size of the feedback window according to predefined window size information. The terminal determines the position of the feedback window in one of following ways: the terminal determines the position of the feedback window according to a notification of a network-side device; the terminal determines the position of the feedback window according to predefined window position information; and the terminal determines the position of the feedback window through blind detection.

In an embodiment, the terminal determines the transmission time of the uplink control information as follows: the terminal determines the transmission time of the uplink control information according to a notification of a network-side device; and/or, the terminal determines the transmission time of the uplink control information according to predefined time information.

In an embodiment, performing, by the terminal, the LBT detection according to the transmission time of the uplink control information, and determining the actual uplink transmission time includes: performing, by the terminal, the LBT detection at the transmission time of the uplink control information; determining, by the terminal, whether the LBT detection succeeds; and if the LBT detection succeeds, then determining, by the terminal, the time when the LBT detection succeeds as the actual uplink transmission time; or, if the LBT detection fails, then performing, by the terminal, the LBT detection in a next sub-frame, and returning to the operation of determining whether the LBT detection succeeds.

In an embodiment, the method further includes: if the terminal performs the LBT detection but the LBT detection fails throughout a preset length of time, then stopping, by the terminal, the LBT detection.

In an embodiment, a start point of the preset length of time is the transmission time of the uplink control information; or, a start point of the preset length of time is transmission time of a Physical Downlink Shared Channel (PDSCH) corresponding to the uplink control information.

In an embodiment, the method further includes: receiving, by the terminal, no downlink data between the transmission time of the uplink control information and the actual uplink transmission time.

In an embodiment, transmitting, by the terminal, the determined uplink control information at the actual uplink transmission time includes: if the terminal is scheduled to transmit uplink data over a Physical Uplink Control Channel (PUCCH) transmission carrier, and the terminal supports concurrent transmission of a PUCCH and a Physical Uplink Shared Channel (PUCCH), then transmitting, by the terminal, the uplink control information in a PUCCH over the PUCCH transmission carrier; or, if the terminal is scheduled to transmit uplink data over the PUCCH transmission carrier, and the terminal does not support concurrent transmission of a PUCCH and a PUCCH, then transmitting, by the terminal, the uplink control information in a PUCCH over the PUCCH transmission carrier.

An embodiment of the disclosure provides another method for transmitting uplink control information. The method includes: performing, by a network-side device, Discontinuous Transmission (DTX) detection according to transmission time of uplink control information, and determining an actual uplink transmission time; receiving, by the network-side device, the uplink control information transmitted by a terminal at the actual uplink transmission time; and determining, by the network-side device, at least one downlink sub-frame corresponding to feedback information in the received uplink control information according to a size of a feedback window and a position of the feedback window. The feedback window is a set of at least one downlink sub-frame for which feedback is to be made in a same uplink sub-frame.

In an embodiment, before the network-side device performs the DTX detection according to the transmission time of the uplink control information, and determines the actual uplink transmission time, the method further includes: notifying, by the network-side device, the terminal of the size of the feedback window; and/or, notifying, by the network-side device, the terminal of the position of the feedback window.

In an embodiment, before the network-side device performs the DTX detection according to the transmission time of the uplink control information, and determines the actual uplink transmission time, the method further includes: notifying, by the network-side device, the terminal of the transmission time of the uplink control information.

In an embodiment, performing, by the network-side device, the DTX detection according to the transmission time of the uplink control information, and determining the actual uplink transmission time includes: performing, by the network-side device, the DTX detection at the transmission time of the uplink control information; determining, by the network-side device, whether the DTX detection succeeds; and, if the DTX detection succeeds, then determining, by the network-side device, the time when LBT detection succeeds as the actual uplink transmission time; or, if the DTX detection fails, then performing, by the network-side device, the DTX detection in a next sub-frame, and returning to the operation of determining whether the DTX detection succeeds.

An embodiment of the disclosure provides a terminal for transmitting uplink control information. The terminal includes: a transmitter; a memory storing at least one instruction; and a processor. The processor configured to execute the at least one instruction to: determine uplink control information according to a size of a feedback window and according to a position of the feedback window, where the feedback window is a set of at least one downlink sub-frame for which feedback is to be made in a same uplink sub-frame; perform LBT detection according to transmission time of the uplink control information; determine an actual uplink transmission time; and control the transmitter to transmit the determined uplink control information at the actual uplink transmission time.

In an embodiment, the processor is further configured to execute the at least one instruction to: determine the size of the feedback window according to a notification of a network-side device; and/or, determine the size of the feedback window according to predefined window size information. The first processor is further configured to execute the at least one instruction to: determine the position of the feedback window in one of following ways: determine the position of the feedback window according to a notification of a network-side device; or, determine the position of the feedback window according to predefined window position information; or, determine the position of the feedback window through blind detection.

In an embodiment, the processor is further configured to execute the at least one instruction to: determine the transmission time of the uplink control information according to a notification of a network-side device; and/or, determine the transmission time of the uplink control information according to predefined time information.

In an embodiment, the processor is further configured to execute the at least one instruction to: perform the LBT detection at the transmission time of the uplink control information determine whether the LBT detection succeeds; and if the LBT detection succeeds, then determine the time when the LBT detection succeeds as the actual uplink transmission time; or, if the LBT detection fails, then perform the LBT detection in a next sub-frame, and return to the operation of determining whether the LBT detection succeeds.

In an embodiment, the processor is further configured to execute the at least one instruction to: if the terminal performs LBT detection but the LBT detection fails throughout a preset length of time, then stop the LBT detection.

In an embodiment, a start point of the preset length of time is the transmission time of the uplink control information. Or, a start point of the preset length of time is transmission time of a PDSCH corresponding to the uplink control information.

In an embodiment, the terminal further includes a receiver. The processor is further configured to execute the at least one instruction to: control the receiver to receive no downlink data between the transmission time of the uplink control information and the actual uplink transmission time.

In an embodiment, the processor is further configured to execute the at least one instruction to: if the terminal is scheduled to transmit uplink data over a PUCCH transmission carrier, and the terminal supports concurrent transmission of a PUCCH and a PUSCH, then control the transmitter to transmit the uplink control information in a PUCCH over the PUCCH transmission carrier; or if the terminal is scheduled to transmit uplink data over the PUCCH transmission carrier, and the terminal does not support concurrent transmission of a PUCCH and a PUSCH, then control the transmitter to transmit the uplink control information in a PUSCH over the PUCCH transmission carrier.

BRIEF DESCRIPTION OF THE DRAWINGS

In order to explain the technical solutions according to the embodiments of the disclosure clearly, the drawings to which reference is made in the description of the embodiments are described below in brief. Apparently the embodiments to be described are only a part of the embodiments of the disclosure. Those ordinarily skilled in the art can further derive from these drawings other drawings without any inventive effort.

DETAILED DESCRIPTION OF THE EMBODIMENTS

In the embodiments of the disclosure, uplink control information is determined according to the size and position of the feedback window, the LBT detection is performed according to the transmission time of the uplink control information, the actual uplink transmission time is determined, and the determined uplink control information is transmitted at the actual uplink transmission time, where the feedback window is the set of at least one downlink sub-frame for which feedback is to be made in the same uplink sub-frame. Since the LBT detection is performed according to the transmission time of the uplink control information, the actual uplink transmission time is determined, and the determined uplink control information is transmitted at the actual uplink transmission time, in the case that no channel is preempted at the preset transmission time of the uplink control information, the LBT detection is repeated once or several times so that the determined uplink control information is transmitted at last at the actual uplink transmission time, thus avoiding the problem that the uplink control information cannot be transmitted correctly in a timely manner because no channel is preempted, so as to further improve the performance of the system.

In order to make the objects, technical solutions, and advantages of the disclosure clearer, the disclosure describes more details below with reference to the drawings. Apparently the embodiments to be described are only a part but not all of the embodiments of the disclosure. Based upon the embodiments herein of the disclosure, all the other embodiments which can occur to those ordinarily skilled in the art without any inventive effort shall fall into the scope of the disclosure.

Figure 1:
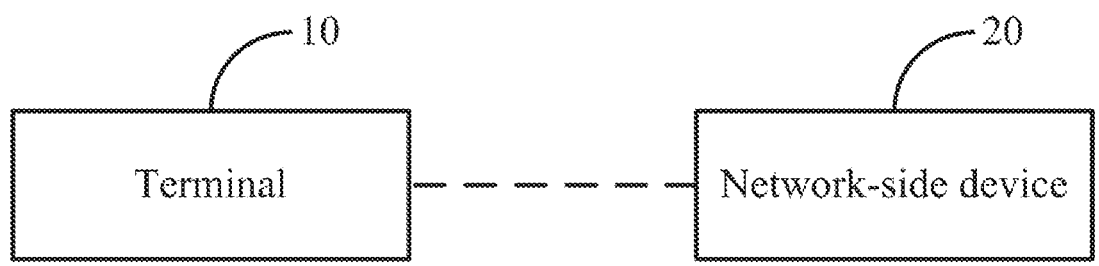
FIG. 1 is a schematic structural diagram of a system for transmitting uplink control information according to an embodiment of the disclosure.

As illustrated in FIG. 1, a system for transmitting uplink control information according to an embodiment of the disclosure includes a terminal 10 and a network-side device 20.

The terminal 10 is configured to: determine uplink control information according to a size of a feedback window and according to a position of the feedback window, where the feedback window is a set of at least one downlink sub-frame for Which feedback is to be made in a same uplink sub-frame; perform LBT detection according to transmission time of the uplink control information, and determine an actual uplink transmission time; and a transmitting module configured to transmit the determined uplink control information at the actual uplink transmission time.

The network-side device 20 is configured to: perform Discontinuous Transmission (DTX) detection according to the transmission time of the uplink control information, determine the actual uplink transmission time; receive the uplink control information transmitted by a terminal at the actual uplink transmission time; and determine at least one downlink sub-frame corresponding to feedback information in the received uplink control information according to a size of a feedback window and a position of the feedback window.

In the embodiment of the disclosure, specific downlink sub-frames for which feedback information is included in the uplink control information are determined by the size and position of the feedback window.

In an embodiment, the terminal determines the size of the feedback window in one or a combination of following ways: the terminal determines the size of the feedback window according to a notification of a network-side device; and the terminal determines the size of the feedback window according to predefined window size information. The terminal determines the position of the feedback window in one of following ways: the terminal determines the position of the feedback window according to a notification of a network-side device; the terminal determines the position of the feedback window according to predefined window position information; and the terminal determines the position of the feedback window through blind detection.

In the embodiment of the disclosure, if the terminal needs to be configured by the network-side device, then the network-side device notifies the terminal of the size of the feedback window, and/or notify the terminal of the position of the feedback window, before the network-side device performs the DTX detection according to the transmission time of the uplink control information and determines the actual uplink transmission time.

The methods for the terminal to determine the size and position of the feedback window respectively are introduced below.

In a first implementation, the terminal determines the size and position of the feedback window as configured at the network side; the network-side device can notify the terminal of the size of the feedback window via higher-layer signaling or via physical layer signaling; and/or, the network-side device can notify the terminal of the position of the feedback window explicitly via higher-layer signaling or via physical layer signaling, or can notify the terminal of the position of the feedback window implicitly via physical layer signaling.

In an implementation, the physical layer signaling can be signaling to trigger the terminal to feed back the uplink control information, or can be common signaling shared by a plurality of users to indicate information about the size of the feedback window and/or to indicate information about the position of the feedback window.

In an implementation, the physical layer signaling can be conventional uplink scheduling signaling, or can include an additional information field or some information field preset to a specific value, to indicate information about the size of the feedback window, and/or to indicate information about the position of the feedback window. For example, 2-bit information is used in the uplink scheduling signaling to indicate the size of the feedback window, where 00 corresponds to that the size of the feedback window is 1, 01 corresponds to that the size of the feedback window is 2, 10 corresponds to that the size of the feedback window is 3, and 11 corresponds to that the size of the feedback window is 4. The position of the feedback window can be obtained implicitly according to a transmission position of the uplink scheduling signaling. For example, the position of the feedback window includes a sub-frame in which the uplink scheduling signaling is transmitted and N−1 consecutive sub-frames preceding the sub-frame, where N is the size of the feedback window.

In a second method, the terminal determines the size and position of the feedback window as predefined.

For example, the size of the feedback window is predefined as 4, and each feedback window is predefined as starting with the sub-frame 0 or starting with the sub-frame 5. Or the size and position of the feedback window are determined under some rule as predefined, and for example, the size and position of the feedback window are determined according to time when a channel is preempted by the terminal.

In a third method, the terminal determines the position of the feedback window through blind detection.

The size of the feedback window cannot be determined through blind detection, but the position of the feedback window can be determined through blind detection.

For example, the terminal detects a PDCCH in each sub-frame until a scheduled sub-frame is detected as the start position of the feedback window.

It shall be noted that the terminal does not have to determine the size and position of the feedback window by using the same method, but may determine the size and position of the feedback window respectively by using different methods as needed. For example, the size can be determined by using the first method above, and the position can be determined by using the second method above.

After the terminal determines the uplink control information according to the size and position of the feedback window, the terminal needs to perform LBT detection according to the transmission time of the uplink control information, and determines the actual uplink transmission time.

The terminal determines the transmission time of the uplink control information as follows: the terminal determines the transmission time of the uplink control information according to a notification of a network-side device; and/or, the terminal determines the transmission time of the uplink control information according to predefined time information.

If the transmission time of the uplink control information needs to be notified by the network-side device, then the network-side device notifies the terminal of the transmission time of the uplink control information.

For example, the network-side device can notify the terminal of the transmission time of the uplink control information explicitly via higher-layer signaling. Or the network-side device can indicate the transmission time of the uplink control information to the terminal explicitly or implicitly via physical layer signaling.

If the transmission time of the uplink control information is determined according to predefined time information, then the time information may be a predefined sub-frame. For example, time at which the uplink control information is to be transmitted is predefined as the sub-frame 0 and the sub-frame 5 in each radio frame.

The time information can also be a predefined rule. For example, time at which the terminal needs to transmit the uplink control information is the fourth sub-frame after the last sub-frame in the feedback window.

In an embodiment, when the terminal performs LBT detection according to the transmission time of the uplink control information, and determines the actual uplink transmission time, the terminal performs LBT detection at the transmission time of the uplink control information.

The terminal determines whether the LBT detection succeeds.

If the LBT detection succeeds, then the terminal determines the time when the LBT detection succeeds as the actual uplink transmission time.

If the LBT detection fails, then the terminal performs the LBT detection in a next sub-frame, and returns to the operation of determining whether the LBT detection succeeds.

If the terminal performs the LBT detection but the LBT detection fails throughout a preset length of time, then the terminal stops the LBT detection.

Stated otherwise, if the LBT detection succeeds, then the terminal determines the transmission time of the uplink control information as the actual uplink transmission time. If the LBT detection fails, then the terminal performs the LBT detection in the next sub-frame, where the terminal can continue to perform the LBT detection in the preset length of time until the LBT detection succeeds, and then determine the time when the LBT detection succeeds as the actual uplink transmission time of the uplink control information.

The preset length of time shall satisfy one or more of the following conditions: the preset length of time is M sub-frames counted from the transmission time of the uplink control information; and the preset length of time is N sub-frames counted from transmission time of a PDSCH corresponding to the uplink control information.

In an embodiment, the terminal receives no downlink data between the transmission time of the uplink control information and the actual uplink transmission time.

Correspondingly the network-side device performs the DTX detection at the transmission time of the uplink control information.

The network-side device determines whether the DTX detection succeeds.

If the DTX detection succeeds, then the network-side device determines the time when the DTX detection succeeds as the actual uplink transmission time.

If the DTX detection fails, then the network-side device performs the DTX detection in a next sub-frame, and returns to the operation of determining whether the DTX detection succeeds.

If the network-side device performs the DTX detection but the DTX detection fails throughout a preset length of time, then the network-side device stops the DTX detection.

At the terminal side, the terminal needs to perform LBT detection before transmitting data, and the terminal can transmit the data only when the LBT detection succeeds. The network-side device needs to perform DTX detection before receiving data, and only when the DTX detection succeeds, which indicates that a PUCCH is transmitted by the terminal, then the network-side device can demodulate the uplink control information.

In an embodiment, the terminal transmits the determined uplink control information at the actual uplink transmission time includes: if the terminal is scheduled to transmit uplink data over a PUCCH transmission carrier, and the terminal supports concurrent transmission of a PUCCH and a PUSCH, then transmitting, by the terminal, the uplink control information in a PUCCH over the PUCCH transmission carrier; or, if the terminal is scheduled to transmit uplink data over the PUCCH transmission carrier, and the terminal does not support concurrent transmission of a PUCCH and a PUSCH, then transmitting, by the terminal, the uplink control information in a PUSCH over the PUCCH transmission carrier.

In an implementation, all the carriers can be grouped into respective carrier groups. A carrier group including a primary carrier is referred to as a primary carrier group, and a carrier group including no primary carrier is referred to as a secondary carrier group. An actual transmission carrier of a PUCCH belongs to the secondary carrier group, and uplink control information transmitted over the actual transmission carrier of the PUCCH can include uplink control information of all the carriers in the secondary carrier group.

In an embodiment, the uplink control information transmitted by the terminal over the actual transmission carrier of the PUCCH includes the uplink control information of all the carriers in the secondary carrier group including the actual transmission carrier of the PUCCH.

The UE transmits the uplink control information over the actual transmission carrier of the PUCCH.

For example, the secondary carrier group includes a carrier 1, a carrier 2, and a carrier 3. If the carrier 1 is the actual transmission carrier of the PUCCH, then uplink control information transmitted over the carrier 1 may include uplink control information of a part or all of the carrier 1, the carrier 2, and the carrier 3.

The network-side device according to the embodiment of the disclosure can be a base station (e.g., a macro base station, a home base station, etc.), or can be another kind of network-side device.

The terminal in the embodiment of the disclosure can also be referred to as a User Equipment (UE), e.g., a terminal which can be connected with the network-side device such as a pad or a mobile phone.

The solution according to the disclosure is described below in details in connection with several embodiments thereof.

First Embodiment

The size of the feedback window is predefined as 1, the position of the feedback window is determined by the terminal through blind detection, and time when the uplink control information is to be transmitted is predefined as the fourth sub-frame after the terminal receives downlink data.

Figure 2:
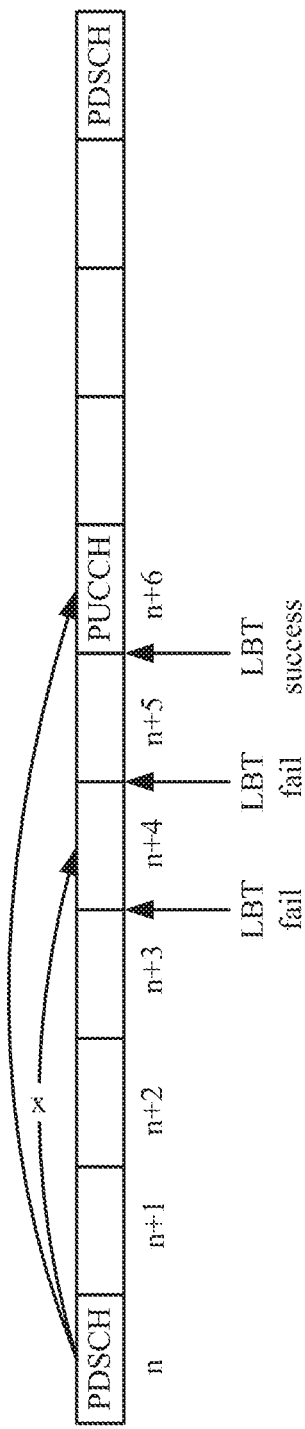
FIG. 2 is a first schematic diagram of uplink control information transmission according to an embodiment of the disclosure.

As illustrated in FIG. 2, the terminal receives a PDSCH in the sub-frame n, and the earliest time when the terminal can make the feedback is the sub-frame n+4 transmitted after the downlink sub-frame n according to the rule above. But the LBT detection fails in the sub-frame n+4, so no data can be transmitted. The terminal continues to perform the LBT detection before the sub-frame n+5, and the LBT detection still fails. The terminal continues to perform the LBT detection before the sub-frame n+6, and the LBT detection succeeds. Then the terminal transmits feedback information of the PDSCH in the sub-frame n+6.

If feedback is to be made for a plurality of carriers, then the same process is performed except that there are a different number of feedback bits. If the terminal does not support concurrent transmission of a PUCCH and a PDSCH, then if there are uplink data scheduled in the current sub-frame after a channel is preempted, the UE may transmit uplink control information in a PUSCH.

The base station starts to perform the DTX detection for a PUCCH in the sub-frame n+4, but no PUCCH is detected in the sub-frame n+4 and in the sub-frame n+5, and the DTX detection succeeds in the sub-frame n+6, so the base station receives the uplink control information in the sub-frame n+6.

A present length of time for LBT detection and DTX detection is 10 ms, and is counted from the sub-frame n+4. If the LBT detection fails from the sub-frame n+4 to the sub-frame n+10, then the terminal stops to transmit any uplink control information. The base station side starts to perform the DTX detection in the sub-frame n+4, and if the DTX detection fails from the sub-frame n+4 to the sub-frame n+10, then the base station determines that the terminal fails to transmit any uplink control information.

Second Embodiment

The size and position of the feedback window and time at which uplink control information is to be transmitted are determined by uplink scheduling information.

Figure 3:
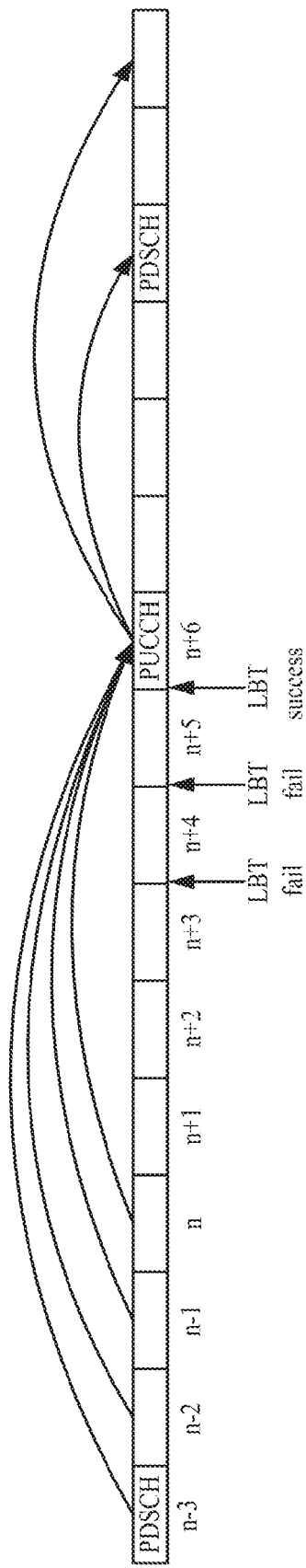
FIG. 3 is a second schematic diagram of uplink control information transmission according to an embodiment of the disclosure.

As illustrated in FIG. 3, the terminal receives a PDSCH in the sub-frame n−3, the sub-frame n−2, the sub-frame n−1, and the sub-frame n, and the terminal receives a piece of uplink scheduling information in the sub-frame n, where the uplink scheduling information instructs the terminal to transmit uplink control information in the sub-frame n+4, and indicates that the size of the feedback window is 4, and the position of the feedback window is a sub-frame in which the uplink scheduling information is transmitted, and three sub-frames preceding the sub-frame. Then the terminal generates feedback information corresponding to these four sub-frames, and starts to perform LBT detection in the sub-frame n+4 until the LBT detection succeeds in the sub-frame n+6, and the terminal transmits uplink control information in the sub-frame n+6.

The base station starts to perform the DTX detection for a PUCCH in the sub-frame n+4, but no PUCCH is detected in the sub-frame n+4 and in the sub-frame n+5, and the DTX detection succeeds in the sub-frame n+6. Then the base station receives the uplink control information in the sub-frame n+6.

If the data received by the terminal in the sub-frame n−3 and in the sub-frame n−1 cannot be demodulated and decoded, then the base station may adjust the size of the feedback window according to an actual condition in the next transmission upon reception of the feedback information. For example, the size of the feedback window for the next transmission is 3, that is, the feedback window includes two retransmitted sub-frames and one new data sub-frame.

Third Embodiment

The largest size of the feedback window is predefined as 4, the actual size of the feedback window is determined dynamically according to a transmission position of uplink control information, the position of the feedback window is determined by the terminal through blind detection, and time when the uplink control information is to be transmitted is determined by uplink scheduling information.

The terminal receives a PDSCH in the sub-frames n−3, n−2, n−1, and n, and the terminal receives a piece of uplink scheduling information in the sub-frame n−3. Then the terminal decides to transmit the uplink control information in the sub-frame n+1, according to a predetermined scheduling or trigger relationship. The transmission of the uplink control information by the terminal can be one of instances.

Figure 4:
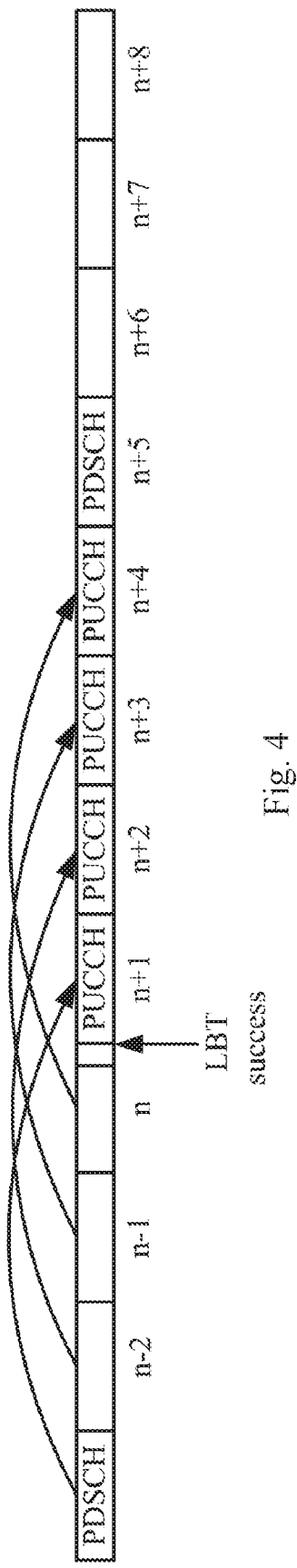
FIG. 4 is a third schematic diagram of uplink control information transmission according to an embodiment of the disclosure.

The first method is as illustrated in FIG. 4.

The terminal firstly generates feedback information for the sub-frame n−3, and then performs LBT detection before the sub-frame n+1 (it shall be noted that some period of time for a guard period (GP) and LBT detection shall be reserved in the last several symbols of the sub-frame n), and if the LBT detection succeeds, then the terminal makes feedback for the sub-frames n−3, n−2, n−1, and n, in the sub-frames n+1, n+2, n+3, and n+4, respectively, where the size of the feedback window is 1.

Figure 5:
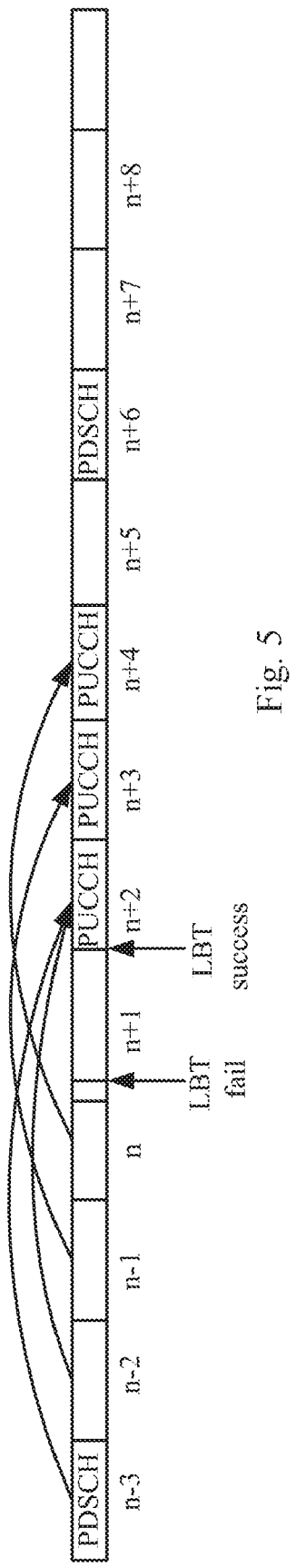
FIG. 5 is a fourth schematic diagram of uplink control information transmission according to an embodiment of the disclosure.

The second instance is as illustrated in FIG. 5.

The terminal firstly generates feedback information for the sub-frame n−3, and then performs LBT detection before the sub-frame n+1. If the LBT detection fails, the terminal regenerates feedback information for the sub-frame n−3 and for the sub-frame n−2, and continues to perform LBT detection before the sub-frame n±2. If the LBT detection succeeds, then the terminal makes feedback for the sub-frames n−3 and n−2 in the sub-frame n+2, and makes feedback respectively for the sub-frame n−1 and for the sub-frame n in the sub-frame n+3 and in the sub-frame n+4. The size of the feedback window is 2, 1, and 1 respectively in the sub-frame n+2, in the sub-frame n+3, and in the sub-frame n+4.

Figure 6:
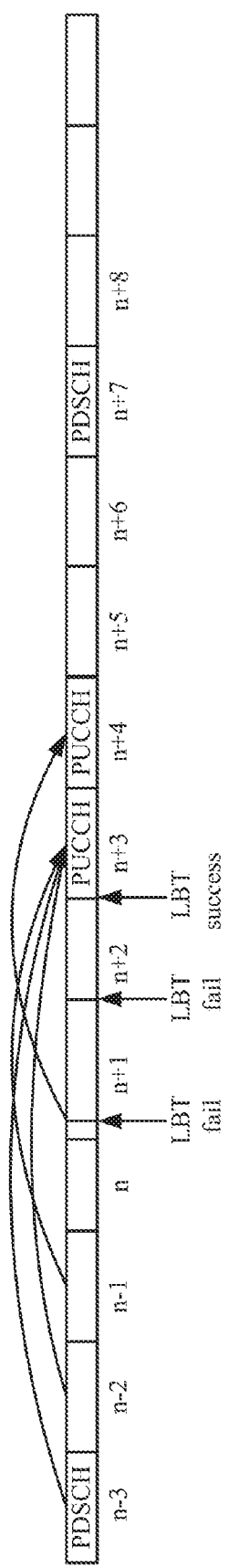
FIG. 6 is a fifth schematic diagram of uplink control information transmission according to an embodiment of the disclosure.

The third instance is as illustrated in FIG. 6.

The terminal performs LBT detection but the LBT detection fails before the sub-frame n+1 and before the sub-frame n+2, then the terminal regenerates feedback information for the sub-frame n−3, for the sub-frame n−2, and for the sub-frame n−1. The terminal continues to perform LBT detection before the sub-frame n+3, and if the LBT detection succeeds, then the terminal makes feedback for the sub-frame n−3, for the sub-frame n−2, and for the sub-frame n−1, in the sub-frame n+3, and makes feedback for the sub-frame n in the sub-frame n+4. The size of the feedback window is 3 and 1 respectively in the sub-frame n+3 and in the sub-frame n+4.

Figure 7:
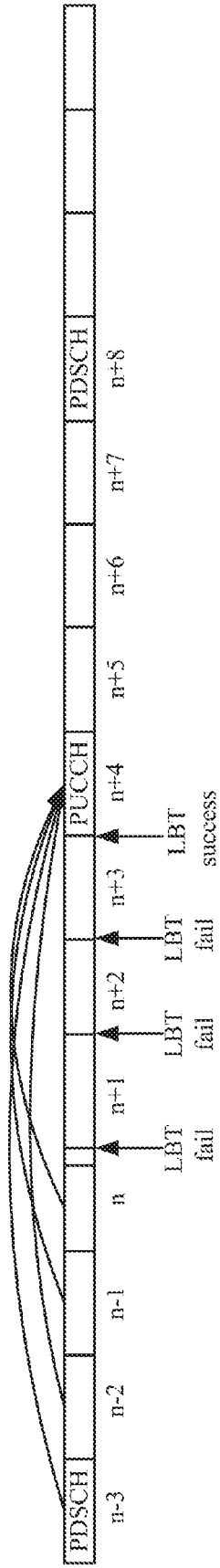
FIG. 7 is a sixth schematic diagram of uplink control information transmission according to an embodiment of the disclosure.

The fourth instance is as illustrated in FIG. 7.

The terminal performs LBT detection but the LBT detection fails before the sub-frame n+1, before the sub-frame n+2, and before the sub-frame n+3, so the terminal regenerates feedback information for the sub-frame n−3, for the sub-frame n−2, for the sub-frame n−1, and for the sub-frame n, and continues to perform LBT detection before the sub-frame n+4. If the LBT detection succeeds, then the terminal makes feedback for the sub-frame n−3, for the sub-frame n−2, for the sub-frame n−1, and for the sub-frame n, in the sub-frame n+4. The size of the feedback window is 4 in the sub-frame n+4.

The fifth instance is as follows.

The terminal performs LBT detections but the LBT detection fails before the sub-frame n+1, before the sub-frame n+2, before the sub-frame n+3, and before the sub-frame n+4, then the terminal continues to perform LBT detection. If the LBT detection succeeds in a preset length of time, then the terminal makes feedback for the sub-frame n−3, for the sub-frame n−2, for the sub-frame n−1, and for the sub-frame n, in a sub-frame in which the LBT detection succeeds. The size of the feedback window is 4. If the LBT detection fails throughout the preset length of time, then the terminal aborts the current uplink transmission.

In this embodiment, the size of the feedback window can also be adjusted so that the numbers of feedback bits carried in different uplink sub-frames are as uniform as possible. For example, in the third instance, the terminal makes feedback for the sub-frame n−3 and for the sub-frame n−2, in the sub-frame n+3, and makes feedback for the sub-frame n−1 and for the sub-frame n, in the sub-frame n+4, where the size of the feedback window is 2 in both the sub-frame n+3 and the sub-frame n+4.

It shall be noted that the PUCCH does not have to occupy a sub-frame in the time domain, but may be transmitted in only one or more Orthogonal Frequency Division Multiplexing (OFDM) symbols. Then the uplink control information can be transmitted under the same rule as that in the solution above except that there are a plurality of PUCCH transmission opportunities in a sub-frame, so if the terminal performs LBT detection successfully in any one of the symbols, then the terminal can transmit the uplink control information directly instead of waiting until the next sub-frame, thus increasing the possibility of successful transmission of the PUCCH.

Furthermore in order to enable a plurality of users to transmit in a time division mode, the base station can further configure the terminal to reserve a symbol for LBT detection in an uplink sub-frame, where an uplink sub-frame configured with a symbol for LBT detection is referred to as a short sub-frame, and at most 13 OFDM symbols are occupied by a PUCCH transmitted in the short sub-frame.

Figure 8:
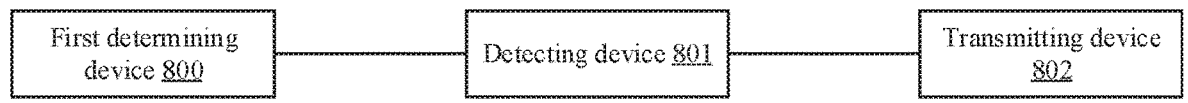
FIG. 8 is a schematic structural diagram of a first terminal according to an embodiment of the disclosure.

As illustrated in FIG. 8, a first terminal according to an embodiment of the disclosure includes: a first determining module 800 configured to determine uplink control information according to a size of a feedback window and according to a position of the feedback window, where the feedback window is a set of at least one downlink sub-frame for which feedback is to be made in a same uplink sub-frame; a detecting module 801 configured to perform LBT detection according to transmission time of the uplink control information, and determine an actual uplink transmission time; and a transmitting module 802 configured to transmit the determined uplink control information at the actual uplink transmission time.

In an embodiment, the first determining module 800 is further configured to determine the size of the feedback window in one of following ways: determining the size of the feedback window according to a notification of a network-side device; and determining the size of the feedback window according to predefined window size information.

In an embodiment, the first determining module 800 is further configured to determine the position of the feedback window in one of following ways: determining the position of the feedback window according to a notification of a network-side device; determining the position of the feedback window according to predefined window position information; and determining the position of the feedback window through blind detection.

In an embodiment, the detecting module 801 is further configured to determine the transmission time of the uplink control information as follows: determining the transmission time of the uplink control information according to a notification of a network-side device; and/or, determining the transmission time of the uplink control information according to predefined time information.

In an embodiment, the detecting module 801 is further configured to perform the LBT detection at the transmission time of the uplink control information; determine whether the LBT detection succeeds; and if the LBT detection succeeds, then determine the time when the LBT detection succeeds as the actual uplink transmission time; or, if the LBT detection fails, then perform the LBT detection in a next sub-frame, and return to the operation of determining whether the LBT detection succeeds.

In an embodiment, the detecting module 801 is further configured to: if the terminal performs LBT detection but the LBT detection fails throughout a preset length of time, then stop the LBT detection.

In an embodiment, a start point of the preset length of time is the transmission time of the uplink control information. Or, a start point of the preset length of time is transmission time of a PDSCH corresponding to the uplink control information.

In an embodiment, the transmitting module 802 is further configured to receive no downlink data between the transmission time of the uplink control information and the actual uplink transmission time.

In an embodiment, the transmitting module 802 is further configured to: if the terminal is scheduled to transmit uplink data over a PUCCH transmission carrier, and the terminal supports concurrent transmission of a PUCCH and a PUSCH, then transmit the uplink control information in a PUCCH over the PUCCH transmission carrier; or if the terminal is scheduled to transmit uplink data over the PUCCH transmission carrier, and the terminal does not support concurrent transmission of a PUCCH and a PDSCH, then transmit the uplink control information in a PDSCH over the PUCCH transmission carrier.

In an embodiment, the uplink control information transmitted by the terminal includes uplink control information of all the carriers in a carrier group including the PUCCH transmission carrier.

Figure 9:
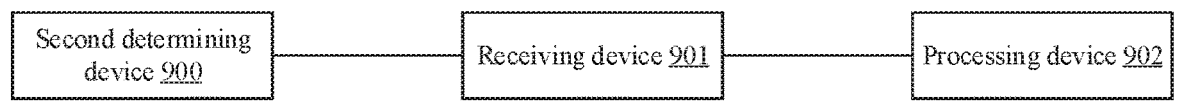
FIG. 9 is a schematic structural diagram of a first network-side device according to an embodiment of the disclosure.

As illustrated in FIG. 9, a first network-side device according to an embodiment of the disclosure includes: a second determining module 900 configured to perform DTX detection according to transmission time of uplink control information, and determine an actual uplink transmission time; a receiving module 901 configured to receive the uplink control information transmitted by a terminal at the actual uplink transmission time; and a processing module 902 configured to determine at least one downlink sub-frame corresponding to feedback information in the received uplink control information according to a size of a feedback window and a position of the feedback window. The feedback window is a set of at least one downlink sub-frame for which feedback is to be made in a same uplink sub-frame.

In an embodiment, the second determining module 900 is further configured to: notify the terminal of the size of the feedback window; and/or, notify the terminal of the position of the feedback window.

In an embodiment, the second determining module 900 is further configured to notify the terminal of the transmission time of the uplink control information.

In an embodiment, the second determining module 900 is further configured to: perform the DTX detection at the transmission time of the uplink control information; determine whether the DTX detection succeeds; and if the DTX detection succeeds, determine the time when LBT detection succeeds as the actual uplink transmission time; or if the DTX detection fails, perform the DTX detection in a next sub-frame, and return to the operation of determining whether the DTX detection succeeds.

Figure 10:
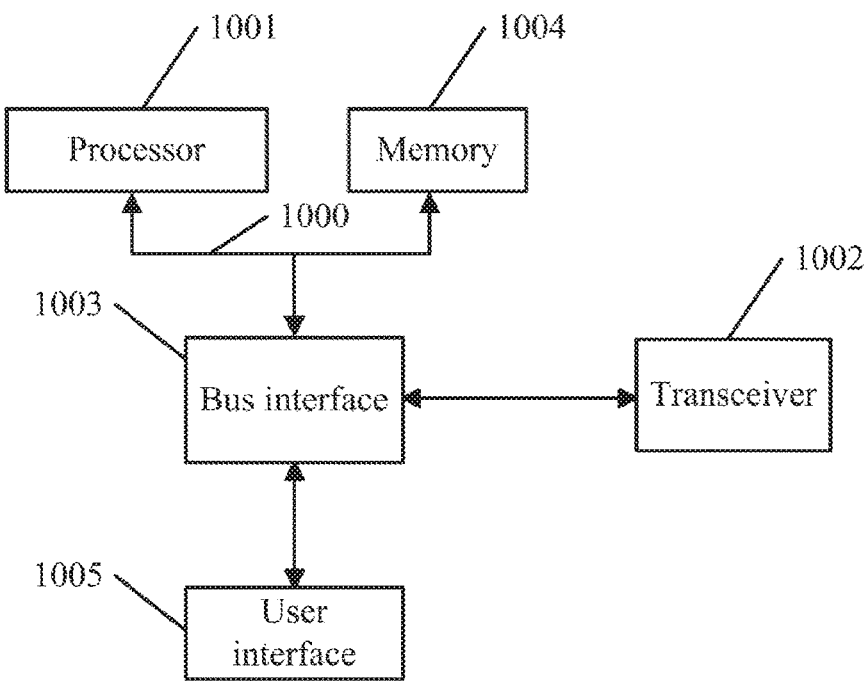
FIG. 10 is a schematic structural diagram of a second terminal according to an embodiment of the disclosure.

As illustrated in FIG. 10, a second terminal according to an embodiment of the disclosure includes a processor 1001 and a transceiver 1002.

The processor is configured to read and execute a program in a memory 1004 to: determine uplink control information according to a size of a feedback window and according to a position of the feedback window, where the feedback window is a set of at least one downlink sub-frame for which feedback is to be made in a same uplink sub-frame; perform LBT detection according to transmission time of the uplink control information; determine an actual uplink transmission time; and transmit the determined uplink control information at the actual uplink transmission time through the transceiver 1002.

The transceiver 1002 is configured to receive and transmit data under the control of the processor 1001.

In an embodiment, the processor 1001 further configured to determine the size of the feedback window in one of the following ways: determining the size of the feedback window according to a notification of a network-side device; and determining the size of the feedback window according to predefined window size information.

In an embodiment, the processor 1001 is further configured to determine the position of the feedback window in one of the following ways: determining the position of the feedback window according to a notification of a network-side device; determining the position of the feedback window according to predefined window position information; and determining the position of the feedback window through blind detection.

In an embodiment, the processor 1001 is further configured to determine the transmission time of the uplink control information as follows: determining the transmission time of the uplink control information according to a notification of a network-side device; and/or, determining the transmission time of the uplink control information according to predefined time information.

In an embodiment, the processor 1001 is further configured to: perform the LBT detection at the transmission time of the uplink control information; determine whether the LBT detection succeeds; and if the LBT detection succeeds, then determine the time when the LBT detection succeeds as the actual uplink transmission time; or, if the LBT detection fails, then perform the LBT detection in a next sub-frame, and return to the operation of determining whether the LBT detection succeeds.

In an embodiment, the processor 1001 is further configured to stop the LBT detection if the terminal performs LBT detection but the LBT detection fails throughout a preset length of time.

In an embodiment, a start point of the preset length of time is the transmission time of the uplink control information. Or, a start point of the preset length of time is transmission time of a PDSCH corresponding to the uplink control information.

In an embodiment, the processor 1001 is further configured to receive no downlink data between the transmission time of the uplink control information and the actual uplink transmission time.

In an embodiment, the processor 1001 is further configured to: if the terminal is scheduled to transmit uplink data over a PUCCH transmission carrier, and the terminal supports concurrent transmission of a PUCCH and a PUSCH, then transmit the uplink control information in a PUCCH over the PUCCH transmission carrier; or if the terminal is scheduled to transmit uplink data over the PUCCH transmission carrier, and the terminal does not support concurrent transmission of a PUCCH and a PUSCH, then transmit the uplink control information in a PDSCH over the PUCCH transmission carrier.

In an embodiment, the uplink control information transmitted by the terminal includes uplink control information of all the carriers in a carrier group including the PUCCH transmission carrier.

In FIG. 10, a bus architecture is represented as a bus 1000, and the bus 1000 can include any number of interconnecting buses and bridges to particularly link together various circuits including one or more processors represented by the processor 1001, and one or more memories represented by the memory 1004. The bus 1000 can further link together various other circuits, e.g., a peripheral device, a manostat, a power management circuit, etc., all of which are well known in the art, so a further description thereof will be omitted in this context. A bus interface 1003 serves as an interface between the bus 1000 and the transceiver 1002. The transceiver 1002 can be an element, or can be a number of elements, e.g., a transmitter and a receiver, which are units for communication with various other devices over a transmission medium. For example, the transceiver 1002 receives external data from another device. The transceiver 1002 is configured to transmit data processed by the processor 1001 to the other device. Dependent upon the nature of a computing system, there may be also a user interface 1005, e.g., a keypad, a display, a loudspeaker, a microphone, a joystick, etc.

The processor 1001 is responsible for managing the bus 1000 and performing normal processes, e.g., running a general-purpose operating system. The memory 1004 can be configured to store data for use by the processor 1001 in performing the operations.

In an embodiment, the processor 1001 can be a Central Processing Unit (CPU), an Application Specific Integrated Circuit (ASIC), a Field-Programmable Gate Array (FPGA), or a Complex Programmable Logic Device (CPLD).

Figure 11:
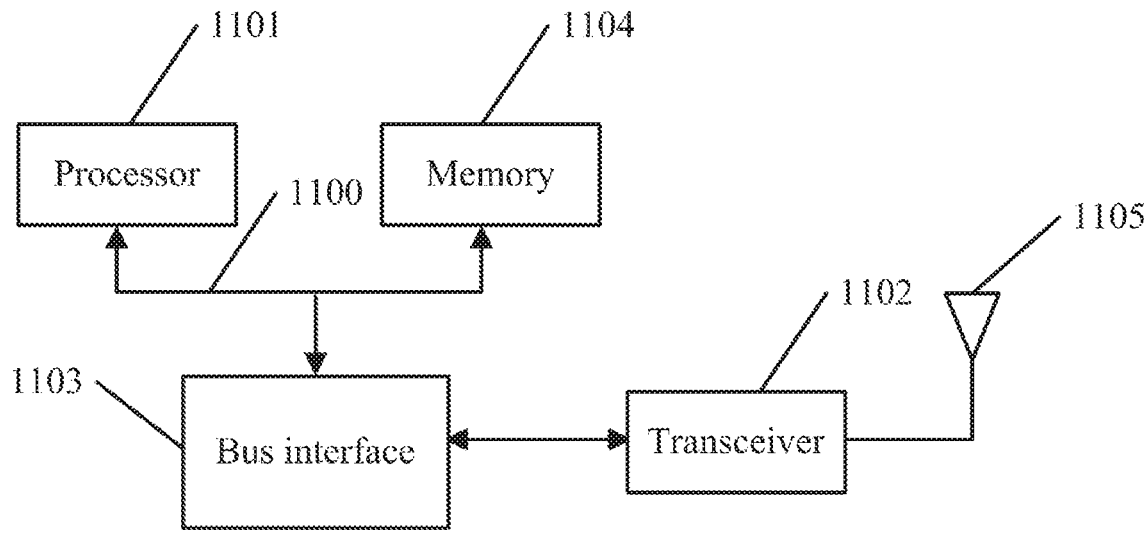
FIG. 11 is a schematic structural diagram of a second network-side device according to an embodiment of the disclosure.

As illustrated in FIG. 11, a second network-side device according to an embodiment of the disclosure includes a processor 1101 configured to read and a execute program in a memory 1104 to: perform DTX detection according to transmission time of uplink control information; determine an actual uplink transmission time; receive, through a transceiver 1102 the uplink control information transmitted by a terminal at the actual uplink transmission time; and determine at least one downlink sub-frame corresponding to feedback information in the received uplink control information according to a size of a feedback window and a position of the feedback window.

The feedback window is a set of at least one downlink sub-frame for which feedback is to be made in a same uplink sub-frame.

The transceiver 1102 is configured to receive and transmit data under the control of the processor 1101.

In an embodiment, the processor 1101 is further configured to: notify the terminal of the size of the feedback window; and/or, notify the terminal of the position of the feedback window.

In an embodiment, the processor 1101 is further configured to notify the terminal of the transmission time of the uplink control information.

In an embodiment, the processor 1101 is further configured to: perform the DTX detection at the transmission time of the uplink control information; determine whether the DTX detection succeeds; and if the DTX detection succeeds, determine the time when LBT detection succeeds as the actual uplink transmission time; or if the DTX detection fails, perform the DTX detection in a next sub-frame, and return to the operation of determining whether the DTX detection succeeds.

In FIG. 11, a bus architecture is represented as a bus 1100, and the bus 1100 can include any number of interconnecting buses and bridges to particularly link together various circuits including one or more processors represented by the processor 1101, and one or more memories represented by the memory 1104. The bus 1100 can further link together various other circuits, e.g., a peripheral device, a manostat, a power management circuit, etc., all of which are well known in the art, so a further description thereof will be omitted in this context. A bus interface 1103 serves as an interface between the bus 1100 and the transceiver 1102. The transceiver 1102 can be an element, or can be a number of elements, e.g., a transmitter and a receiver, which are units for communication with various other devices over a transmission medium. Data processed by the processor 1101 are transmitted through an antenna 1105 over a radio medium, and furthermore the antenna 1105 further receives data, and transmits the data to the processor 1101.

The processor 1101 is responsible for managing the bus 1100 and performing normal processes, and can further perform various functions of timing, a peripheral interface, voltage regulation, power supply management, and other control functions. The memory 1104 can be configured to store data for use by the processor 1101 in performing the operations.

In an embodiment, the processor 1101 can be a CPU, an ASIC, an FPGA, or a CPLD.

Based upon the same inventive idea, an embodiment of the disclosure further provides a method for transmitting uplink control information at the terminal side. Since a device corresponding to this method is the terminal in the system for transmitting uplink control information according to the embodiments of the disclosure, and this method addresses the problem under a similar principle to the system, reference can be made to the implementation of the system for an implementation of this method, and a repeated description thereof is omitted here.

Figure 12:
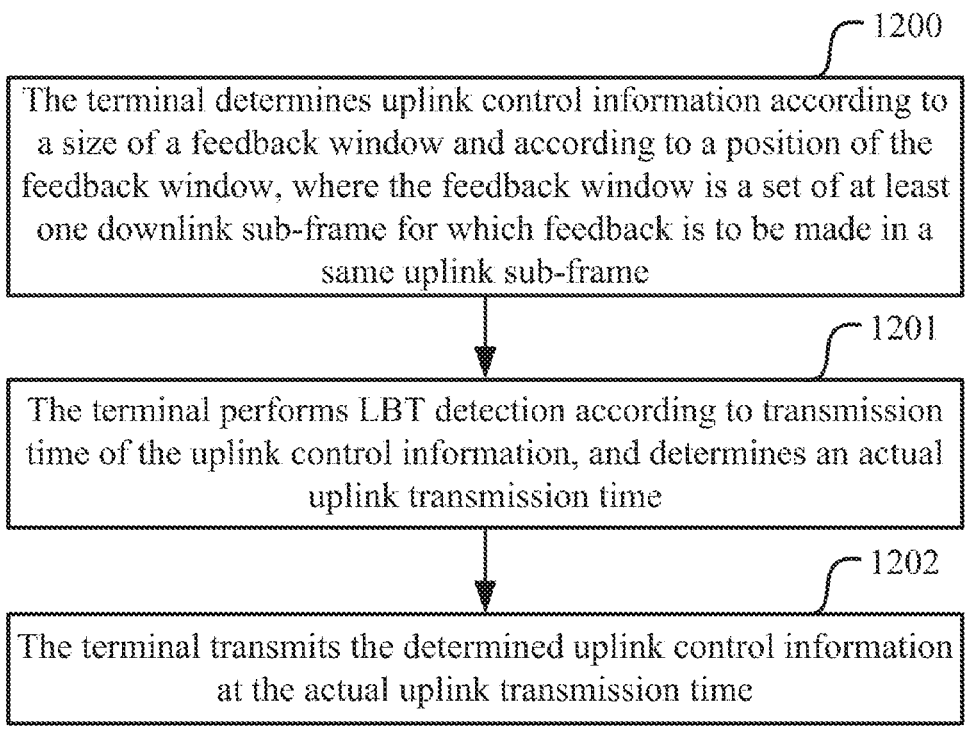
FIG. 12 is a schematic flow chart of a method for transmitting uplink control information at the terminal side according to an embodiment of the disclosure.

As illustrated in FIG. 12, the method for transmitting uplink control information at the terminal side according to the embodiment of the disclosure includes the following operations.

In the operation 1200, the terminal determines uplink control information according to a size of a feedback window and according to a position of the feedback window, where the feedback window is a set of at least one downlink sub-frame for which feedback is to be made in a same uplink sub-frame.

In the operation 1201, the terminal performs LBT detection according to transmission time of the uplink control information, and determines an actual uplink transmission time.

In the operation 1202, the terminal transmits the determined uplink control information at the actual uplink transmission time.

In an embodiment, the terminal determines the size of the feedback window in one or of following ways: the terminal determines the size of the feedback window according to a notification of a network-side device; and the terminal determines the size of the feedback window according to predefined window size information.

In an embodiment, the terminal determines the position of the feedback window in one of following ways: the terminal determines the position of the feedback window according to a notification of a network-side device; the terminal determines the position of the feedback window according to predefined window position information; and the terminal determines the position of the feedback window through blind detection.

In an embodiment, the terminal determines the transmission time of the uplink control information as follows: the terminal determines the transmission time of the uplink control information according to a notification of a network-side device; and/or, the terminal determines the transmission time of the uplink control information according to predefined time information.

In an embodiment, the terminal performs the LBT detection according to the transmission time of the uplink control information, and determines the actual uplink transmission time as follows: the terminal performs the LBT detection at the transmission time of the uplink control information; the terminal determines whether the LBT detection succeeds; and, if the LBT detection succeeds, then the terminal determines the time when the LBT detection succeeds as the actual uplink transmission time; or, if the LBT detection fails, then the terminal performs the LBT detection in a next sub-frame, and returns to the operation of determining whether the LBT detection succeeds.

In an embodiment, the method further includes: if the terminal performs the LBT detection but the LBT detection fails throughout a preset length of time, then the terminal stops the LBT detection.

In an embodiment, a start point of the preset length of time is the transmission time of the uplink control information; or, a start point of the preset length of time is transmission time of a PDSCH corresponding to the uplink control information.

In an embodiment, the method further includes: the terminal receives no downlink data between the transmission time of the uplink control information and the actual uplink transmission time.

In an embodiment, the terminal transmits the determined uplink control information at the actual uplink transmission time includes: if the terminal is scheduled to transmit uplink data over a PUCCH transmission carrier, and the terminal supports concurrent transmission of a PUCCH and a PUSCH, then the terminal transmits the uplink control information in a PUCCH over the PUCCH transmission carrier; or, if the terminal is scheduled to transmit uplink data over the PUCCH transmission carrier, and the terminal does not support concurrent transmission of a PUCCH and a PUSCH, then the terminal transmits the uplink control information in a PUSCH over the PUCCH transmission carrier.

In an embodiment, the uplink control information transmitted by the terminal includes uplink control information of all the carriers in a carrier group including the PUCCH transmission carrier.

Based upon the same inventive idea, an embodiment of the disclosure further provides a method for transmitting uplink control information at the network side, and since a device corresponding to this method is the network-side device in the system for transmitting uplink control information according to the embodiment of the disclosure, and this method addresses the problem under a similar principle to the system, reference can be made to the implementation of the system for an implementation of this method, and a repeated description thereof is omitted here.

Figure 13:
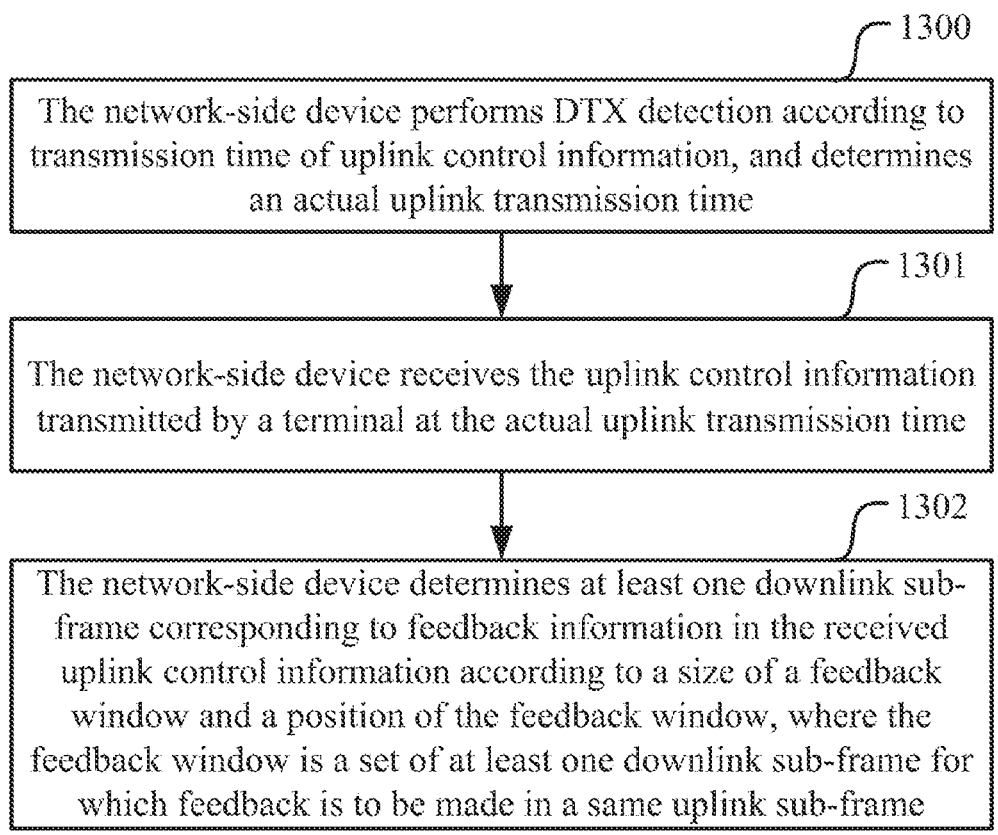
FIG. 13 is a schematic flow chart of a method for transmitting uplink control information at the network side according to an embodiment of the disclosure.

As illustrated in FIG. 13, the method for transmitting uplink control information at the network side according to the embodiment of the disclosure includes the following operations.

In the operation 1300, the network-side device performs DTX detection according to transmission time of uplink control information, and determines an actual uplink transmission time.

In the operation 1301, the network-side device receives the uplink control information transmitted by a terminal at the actual uplink transmission time.

In the operation 1302, the network-side device determines at least one downlink sub-frame corresponding to feedback information in the received uplink control information according to a size of a feedback window and a position of the feedback window.

The feedback window is a set of at least one downlink sub-frame for which feedback is to be made in a same uplink sub-frame.

In an embodiment, before the network-side device performs the DTX detection according to the transmission time of the uplink control information, and determines the actual uplink transmission time, the method further includes: the network-side device notifies the terminal of the size of the feedback window; and/or, the network-side device notifies the terminal of the position of the feedback window.

In an embodiment, before the network-side device performs the DTX detection according to the transmission time of uplink control information, and determines the actual uplink transmission time, the method further includes: the network-side device notifies the terminal of the transmission time of the uplink control information.

In an embodiment, the network-side device performs the DTX detection according to the transmission time of the uplink control information, and determines the actual uplink transmission time includes: the network-side device performs the DTX detection at the transmission time of the uplink control information; the network-side device determines whether the DTX detection succeeds; and if the DTX detection succeeds, then the network-side device determines the time when the DTX detection succeeds as the actual uplink transmission time; or if the DTX detection fails, then the network-side device performs DTX detection in a next sub-frame, and returns to the operation of determining whether the DTX detection succeeds.

As can be apparent from the disclosure above, In the embodiments of the disclosure, uplink control information is determined according to the size and position of the feedback window, the LBT detection is performed according to the transmission time of the uplink control information, the actual uplink transmission time is determined, and the determined uplink control information is transmitted at the actual uplink transmission time, where the feedback window is the set of at least one downlink sub-frame for which feedback is to be made in the same uplink sub-frame. Since the LBT detection is performed according to the transmission time of the uplink control information, the actual uplink transmission time is determined, and the determined uplink control information is transmitted at the actual uplink transmission time, in the case that no channel is preempted at the preset transmission time of the uplink control information, the LBT detection is repeated once or several times so that a channel can be accessed at any time without preempting any channel, thus avoiding the problem that the uplink control information cannot be transmitted correctly in a timely manner because no channel is preempted, so as to further improve the performance of the system.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the disclosure can be further embodied in hardware and/or software (including firmware, resident software, microcodes, etc.). Still furthermore the disclosure can be embodied in the form of a computer program product on a computer useable or readable storage medium, where the computer program product includes computer useable or readable program codes embodied in the medium to be used by or in connection with an instruction executing system. In the context of the disclosure, the computer useable or readable medium can be any medium which can include, store, communicate, transmit, or transport program to be used by or in connection with an instruction executing system, apparatus or device.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting uplink control information, comprising:
    determining, by a terminal, uplink control information according to a size of a feedback window and according to a position of the feedback window, wherein the feedback window is a set of at least one downlink sub-frame for which feedback is to be made in a same uplink sub-frame;
    performing, by the terminal, Listen Before Talk (LBT) detection according to transmission time of the uplink control information, and determining an actual uplink transmission time; and
    transmitting, by the terminal, the determined uplink control information at the actual uplink transmission time.

2. The method according to claim 1, wherein the terminal determines the size of the feedback window in one or a combination of following ways:
    the terminal determines the size of the feedback window according to a notification of a network-side device; and
    the terminal determines the size of the feedback window according to predefined window size information; and
    the terminal determines the position of the feedback window in one of following ways:
    the terminal determines the position of the feedback window according to a notification of a network-side device;
    the terminal determines the position of the feedback window according to predefined window position information; and
    the terminal determines the position of the feedback window through blind detection.

3. The method according to claim 1, wherein the terminal determines the transmission time of the uplink control information as follows:
    the terminal determines the transmission time of the uplink control information according to a notification of a network-side device; and/or
    the terminal determines the transmission time of the uplink control information according to predefined time information.

4. The method according to claim 1, wherein performing, by the terminal, the LBT detection according to the transmission time of the uplink control information, and determining the actual uplink transmission time comprises:
    performing, by the terminal, the LBT detection at the transmission time of the uplink control information;
    determining, by the terminal, whether the LBT detection succeeds; and
    if the LBT detection succeeds, then determining, by the terminal, the time when the LBT detection succeeds as the actual uplink transmission time; or
    if the LBT detection fails, then performing, by the terminal, the LBT detection in a next sub-frame, and returning to the operation of determining whether the LBT detection succeeds.

5. The method according to claim 4, further comprising:
    if the terminal performs the LBT detection but the LBT detection fails throughout a preset length of time, then stopping, by the terminal, the LBT detection.

6. The method according to claim 5, wherein a start point of the preset length of time is the transmission time of the uplink control information; or
    a start point of the preset length of time is transmission time of a Physical Downlink Shared Channel (PDSCH) corresponding to the uplink control information.

7. The method according to claim 4, further comprising:
    receiving, by the terminal, no downlink data between the transmission time of the uplink control information and the actual uplink transmission time.

8. The method according to claim 1, wherein transmitting, by the terminal, the determined uplink control information at the actual uplink transmission time comprises:
    if the terminal is scheduled to transmit uplink data over a Physical Uplink Control Channel (PUCCH) transmission carrier, and the terminal supports concurrent transmission of a PUCCH and a Physical Uplink Shared Channel (PUSCH), then transmitting, by the terminal, the uplink control information in a PUCCH over the PUCCH transmission carrier; or
    if the terminal is scheduled to transmit uplink data over the PUCCH transmission carrier, and the terminal does not support concurrent transmission of a PUCCH and a PUSCH, then transmitting, by the terminal, the uplink control information in a PUSCH over the PUCCH transmission carrier.

9. A method for transmitting uplink control information, comprising:
    performing, by a network-side device, Discontinuous Transmission (DTX) detection according to transmission time of uplink control information, and determining an actual uplink transmission time;
    receiving, by the network-side device, the uplink control information transmitted by a terminal at the actual uplink transmission time; and
    determining, by the network-side device, at least one downlink sub-frame corresponding to feedback information in the received uplink control information according to a size of a feedback window and a position of the feedback window;
  wherein the feedback window is a set of at least one downlink sub-frame for which feedback is to be made in a same uplink sub-frame.

10. The method according to claim 9, before the network-side device performs the DTX detection according to the transmission time of the uplink control information, and determines the actual uplink transmission time, further comprising:
  notifying, by the network-side device, the terminal of the size of the feedback window; and/or
  notifying, by the network-side device, the terminal of the position of the feedback window.

11. The method according to claim 9, before the network-side device performs the DTX detection according to the transmission time of the uplink control information, and determines the actual uplink transmission time, further comprising:
  notifying, by the network-side device, the terminal of the transmission time of the uplink control information.

12. The method according to claim 9, wherein performing, by the network-side device, the DTX detection according to the transmission time of the uplink control information, and determining the actual uplink transmission time comprises:
  performing, by the network-side device, the DTX detection at the transmission time of the uplink control information;
  determining, by the network-side device, whether the DTX detection succeeds; and
  if the DTX detection succeeds, then determining, by the network-side device, the time when Listen Before Talk (LBT) detection succeeds as the actual uplink transmission time; or
  if the DTX detection fails, then performing, by the network-side device, the DTX detection in a next sub-frame, and returning to the operation of determining whether the DTX detection succeeds.

13. A terminal for transmitting uplink control information, comprising:
  a transmitter;
  a memory storing at least one instruction; and
  a processor configured to execute the at least one instruction to:
  determine uplink control information according to a size of a feedback window and according to a position of the feedback window, wherein the feedback window is a set of at least one downlink sub-frame for which feedback is to be made in a same uplink sub-frame;
  perform Listen Before Talk (LBT) detection according to transmission time of the uplink control information;
  determine an actual uplink transmission time; and
  control the transmitter to transmit the determined uplink control information at the actual uplink transmission time.

14. The terminal according to claim 13, wherein the processor is further configured to execute the at least one instruction to:
  determine the size of the feedback window according to a notification of a network-side device; and/or,
  determine the size of the feedback window according to predefined window size information; and
  the processor is further configured to execute the at least one instruction to:
  determine the position of the feedback window according to a notification of a network-side device; or,
  determine the position of the feedback window according to predefined window position information; or,
  determine the position of the feedback window through blind detection.

15. The terminal according to claim 13, wherein the processor is further configured to execute the at least one instruction to:
  determine the transmission time of the uplink control information according to a notification of a network-side device; and/or
  determine the transmission time of the uplink control information according to predefined time information.

16. The terminal according to claim 13, wherein the processor is further configured to execute the at least one instruction to:
  perform the LBT detection at the transmission time of the uplink control information;
  determine whether the LBT detection succeeds; and
  if the LBT detection succeeds, then determine the time when the LBT detection succeeds as the actual uplink transmission time; or
  if the LBT detection fails, then perform the LBT detection in a next sub-frame, and return to the operation of determining whether the LBT detection succeeds.

17. The terminal according to claim 16, wherein the processor is further configured to execute the at least one instruction to:
  if the terminal performs LBT detection but the LBT detection fails throughout a preset length of time, then stop the LBT detection.

18. The terminal according to claim 17, wherein a start point of the preset length of time is the transmission time of the uplink control information; or
  a start point of the preset length of time is transmission time of a Physical Downlink Shared Channel (PDSCH) corresponding to the uplink control information.

19. The terminal according to claim 16, further comprising a receiver, wherein the processor is further configured to execute the at least one instruction to:
  control the receiver to receive no downlink data between the transmission time of the uplink control information and the actual uplink transmission time.

20. The terminal according to claim 13, wherein the processor is further configured to execute the at least one instruction to:
  if the terminal is scheduled to transmit uplink data over a Physical Uplink Control Channel (PUCCH) transmission carrier, and the terminal supports concurrent transmission of a PUCCH and a Physical Uplink Shared Channel (PUSCH), then control the transmitter to transmit the uplink control information in a PUCCH over the PUCCH transmission carrier; or
  if the terminal is scheduled to transmit uplink data over the PUCCH transmission carrier, and the terminal does not support concurrent transmission of a PUCCH and a PUSCH, then control the transmitter to transmit the uplink control information in a PUSCH over the PUCCH transmission carrier.

* * * * *